No. 829,958. PATENTED SEPT. 4, 1906.
F. E. FAIRMAN.
REVERSING GEAR.
APPLICATION FILED SEPT. 7, 1905.
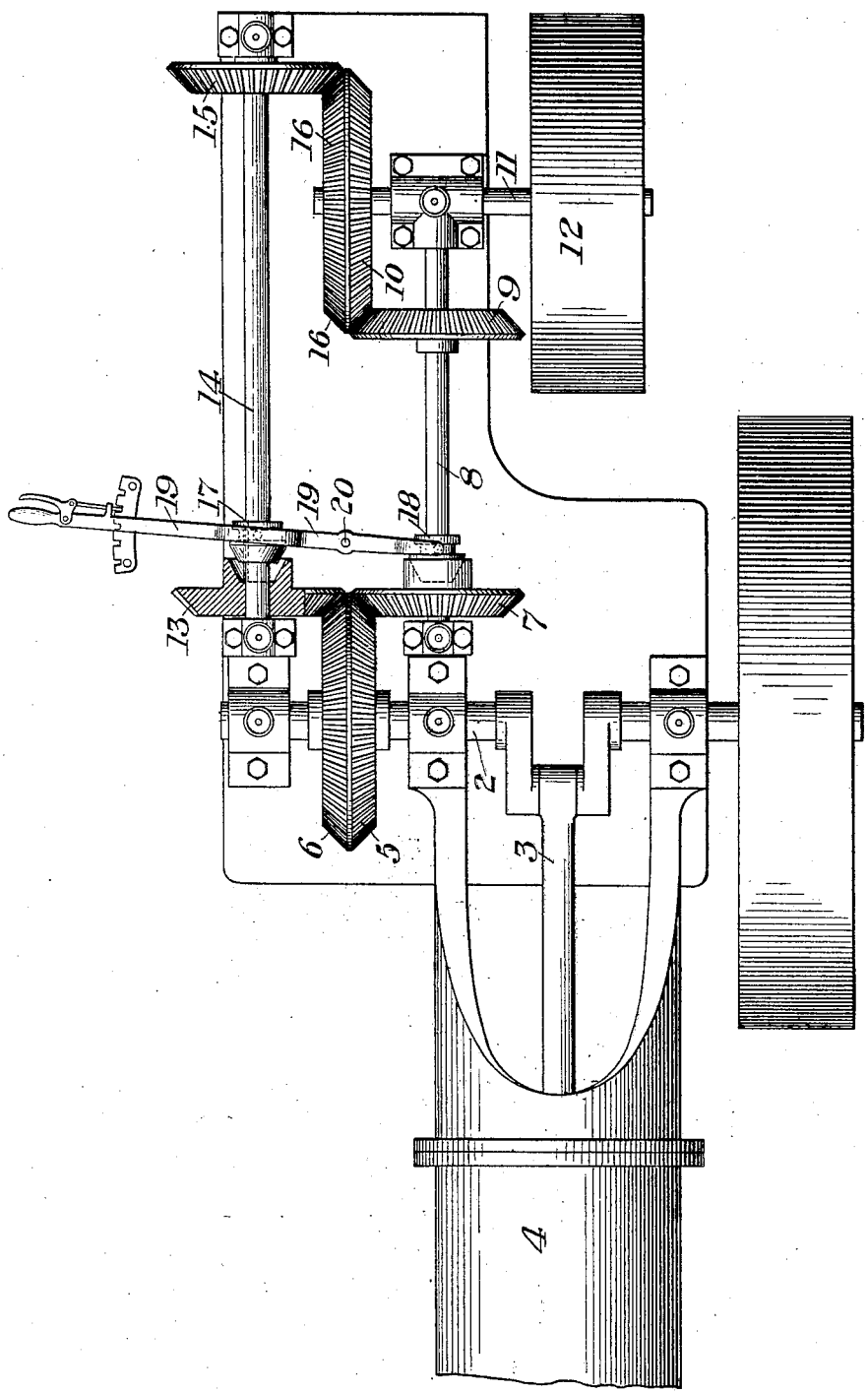
WITNESSES
R A Balderson
G. B. Bleming
INVENTOR
F. E. Fairman
by Ballonie Byrnes
his attys

UNITED STATES PATENT OFFICE.

FRANCIS E. FAIRMAN, OF ALLEGHENY, PENNSYLVANIA.

REVERSING-GEAR.

No. 829,958. Specification of Letters Patent. Patented Sept. 4, 1906.

Application filed September 7, 1905. Serial No. 277,348.

*To all whom it may concern:*

Be it known that I, FRANCIS E. FAIRMAN, of Allegheny, Allegheny county, Pennsylvania, have invented a new and useful Reversing-Gear, of which the following is a full, clear, and exact description, reference being had to the accompanying drawing, forming part of this specification, in which the figure is a diagrammatic plan view showing one form of my improved gear.

My invention relates to devices for reversing the direction of motion of a driven shaft while continuously rotating the driving-shaft in the same direction.

The object of the invention is to provide a cheap and efficient system for accomplishing these results without throwing the gears into and out of mesh and while rotating the driving-shaft in the same direction.

In the drawing, 2 represents the driving-shaft, having a crank with pitman 3 driven by any suitable motor 4. On the shaft 2 is a double bevel-wheel having two sets of teeth 5 and 6. The teeth 5 intermesh with a bevel-wheel 7, loosely mounted on a shaft 8, extending at right angles to shaft 2. The shaft 8 has a bevel-gear 9 secured to it and intermeshing with the teeth 10 of another double bevel-wheel secured to shaft 11, extending substantially parallel with the shaft 2 and having a pulley 12 or other driving means. The teeth 6 of the double bevel-wheel on shaft 2 intermesh with a bevel-wheel 13, loosely mounted on a shaft 14, which is parallel with the shaft 8. To the shaft 14 is secured a bevel-wheel 15, which intermeshes with the teeth 16 on the double bevel-wheel of the shaft 11. Clutches 17 and 18 are provided between the gears 7 and 13 and their shafts 8 and 14. I preferably arrange a hand-lever 19, which is fulcrumed at 20 and is connected to the two clutches, so that as one of the gear-wheels is clutched to its shaft the other is disconnected from its shaft.

In using the device all of the gear-wheels rotate continuously. With the parts in the form shown wheel 7 is clutched to the shaft 8 and drives the shaft 11 through the gears 9 and 10. If it is desired to reverse the motion, the hand-lever 19 is actuated to unclutch the gear 7 and to connect the gear 13 to the shaft 14. Power will thus be transmitted, through wheel 13, shaft 14, and gears 15 and 16, to the shaft 11, thus reversing its direction of motion.

The advantages of my invention result from the simplicity of the system and the reversing of the driven shaft without throwing gears into and out of mesh. The shaft 11 may be made the driving-shaft, the shaft 2 then becoming a driven shaft, the gears 5 and 6, as well as 10 and 16, may be made as separate wheels instead of a double-toothed bevel-wheel, and many other variations may be made in the form and arrangement of the parts without departing from my invention.

I claim—

1. In a transmission-gear, a driving-shaft and a driven shaft, two sets of bevel-gear teeth carried by each of the said shafts, a pair of intermediate shafts, bevel-gears on the intermediate shafts intermeshing with the respective sets of bevel-teeth carried by the driving-shaft, and other bevel-gears on the intermediate shafts intermeshing with the bevel-gear teeth carried by the driven shaft, one set of the gears on the intermediate shafts being loosely mounted, and means for connecting these loose gears with and disconnecting them from said intermediate shafts; substantially as described.

2. In a transmission-gear, a driving and a driven shaft extending in substantial parallelism a double bevel-wheel on each shaft, a pair of intermediate shafts, a gear on each intermediate shaft a gear intermeshing with one of the sets of teeth on the double gear of the driving-shaft, other gears on the intermediate shafts intermeshing with the double bevel-wheel on the driven shaft, at least one of the sets of gears on the intermediate shafts being loosely mounted, and clutches arranged to connect or disconnect them with their shafts; substantially as described.

3. In a transmission-gear, a driving and a driven shaft extending in substantial parallelism a double bevel-wheel on each shaft, a pair of intermediate shafts, a gear on each intermediate shaft intermeshing with one of the sets of teeth on the double gear of the driving-shaft, and other gears on the intermediate shafts intermeshing with the double bevel-wheel on the driven shaft, at least one of the sets of gears on the intermediate shafts being loosely mounted, clutches arranged to connect or disconnect them with their shafts, and a hand-lever arranged to disconnect one clutch and throw in the other clutch; substantially as described.

In testimony whereof I have hereunto set my hand

FRANCIS E. FAIRMAN.

Witnesses
GEO. B. BLEMING,
R. A. BALDERSON.